United States Patent
McGlaughlin et al.

(10) Patent No.: US 11,868,267 B2
(45) Date of Patent: *Jan. 9, 2024

(54) ACCESS UNIT AND MANAGEMENT SEGMENT MEMORY OPERATIONS

(71) Applicant: Micron Technology, Inc., Boise, ID (US)

(72) Inventors: Edward C. McGlaughlin, Minneapolis, MN (US); Gary J. Lucas, Somerset, WI (US); Joseph M. Jeddeloh, Shoreview, MN (US)

(73) Assignee: Micron Technology, Inc., Boise, ID (US)

( * ) Notice: Subject to any disclaimer, the term of this patent is extended or adjusted under 35 U.S.C. 154(b) by 3 days.

This patent is subject to a terminal disclaimer.

(21) Appl. No.: 17/708,677

(22) Filed: Mar. 30, 2022

(65) Prior Publication Data

US 2022/0222181 A1 Jul. 14, 2022

Related U.S. Application Data

(63) Continuation of application No. 17/007,772, filed on Aug. 31, 2020, now Pat. No. 11,301,391, which is a
(Continued)

(51) Int. Cl.
*G06F 12/10* (2016.01)
(52) U.S. Cl.
CPC ...... *G06F 12/10* (2013.01); *G06F 2212/1044* (2013.01); *G06F 2212/657* (2013.01)
(58) Field of Classification Search
CPC ...... G05B 13/00–048; G05B 15/00–02; G05B 17/00–02; G06F 1/00–3296;
(Continued)

(56) References Cited

U.S. PATENT DOCUMENTS

| 4,473,878 A | 9/1984 | Zolnowsy et al. |
| 7,793,036 B2 | 9/2010 | Goh et al. |

(Continued)

FOREIGN PATENT DOCUMENTS

| CN | 103635968 A | 3/2014 |
| CN | 103914398 A | 7/2014 |

(Continued)

OTHER PUBLICATIONS

G. Zhang, Y. Deng, Y. Zhou, S. Pang, J. Yue and Y. Zhu, "Cocktail: Mixing Data With Different Characteristics to Reduce Read Reclaims for nand Flash Memory," in IEEE Transactions on Computer-Aided Design of Integrated Circuits and Systems, vol. 42, No. 7, pp. 2336-2349, Jul. 2023 (Year: 2023).*

(Continued)

*Primary Examiner* — Daniel C. Chappell
(74) *Attorney, Agent, or Firm* — Brooks, Cameron & Huebsch, PLLC (57) ABSTRACT

A system includes a first memory component having a particular access size associated with performance of memory operations, a second memory component to store a logical to physical data structure whose entries map management segments to respective physical locations in the memory component, wherein each management segment corresponds to an aggregated plurality of logical access units having the particular access size, and a processing device, operably coupled to the memory component. The processing device can perform memory management operations on a per management segment basis by: for each respective management segment, tracking access requests to constituent access units corresponding to the respective management segment, and determining whether to perform a particular memory management operation on the respective management segment based on the tracking.

20 Claims, 5 Drawing Sheets

Related U.S. Application Data continuation of application No. 16/149,961, filed on Oct. 2, 2018, now Pat. No. 10,817,430.

(58) Field of Classification Search
CPC .............. G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06K 9/00–6298; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 27/00–3293; H01L 2225/00–1094; H03M 7/00–707; H04L 9/00–38; H04L 12/00–66; H04L 41/00–5096; H04L 49/00–9094; H04L 61/00–59; H04L 67/00–75

See application file for complete search history.

(56) References Cited

U.S. PATENT DOCUMENTS

| | | | |
|---|---|---|---|
| 8,316,201 | B2 | 11/2012 | Stern |
| 8,438,361 | B2 | 5/2013 | Goss |
| 8,531,880 | B2 | 9/2013 | Rao |
| 8,730,721 | B2 | 5/2014 | Camp et al. |
| 8,762,658 | B2 | 6/2014 | Flynn |
| 9,092,310 | B2 | 7/2015 | Zhang et al. |
| 9,189,390 | B2 | 11/2015 | Iaculo et al. |
| 9,213,632 | B1* | 12/2015 | Song .................... G06F 3/0685 |
| 9,218,881 | B2 | 12/2015 | Yang et al. |
| 9,389,808 | B2* | 7/2016 | Kurita .............. G06F 16/24569 |
| 9,535,608 | B1 | 1/2017 | Busaba et al. |
| 9,830,087 | B2 | 11/2017 | Fontana et al. |
| 9,851,910 | B2 | 12/2017 | Cohen |
| 10,236,032 | B2* | 3/2019 | Oh .......................... G11C 5/04 |
| 10,817,430 | B2* | 10/2020 | McGlaughlin ...... G06F 12/0246 |
| 2005/0021921 | A1* | 1/2005 | Blackmon ........... G06F 13/1631 711/158 |
| 2008/0005475 | A1* | 1/2008 | Lubbers ............... G06F 3/0676 711/118 |
| 2009/0103364 | A1* | 4/2009 | Pekny ................ G06F 12/0804 365/185.17 |
| 2010/0067278 | A1* | 3/2010 | Oh .......................... G11C 5/04 365/51 |
| 2011/0185105 | A1 | 7/2011 | Yano |
| 2011/0264859 | A1 | 10/2011 | Yano |
| 2012/0290798 | A1 | 11/2012 | Huang |
| 2012/0303868 | A1 | 11/2012 | Tucek |
| 2012/0311232 | A1 | 12/2012 | Porterfield |
| 2013/0042056 | A1 | 2/2013 | Shats |
| 2013/0166827 | A1 | 6/2013 | Cideciyan et al. |
| 2013/0246734 | A1 | 9/2013 | Schaefer |
| 2013/0246891 | A1 | 9/2013 | Manning |
| 2014/0040550 | A1* | 2/2014 | Nale ................... G06F 13/1694 711/118 |
| 2014/0068152 | A1* | 3/2014 | Sinclair ............... G06F 12/0246 711/103 |
| 2014/0189286 | A1 | 7/2014 | Chang et al. |
| 2016/0118132 | A1* | 4/2016 | Prins ..................... G06F 11/076 714/704 |
| 2017/0031629 | A1* | 2/2017 | Nakamoto .......... G06F 12/0246 |
| 2017/0235673 | A1 | 8/2017 | Patel et al. |
| 2017/0286287 | A1 | 10/2017 | Hady |
| 2017/0322749 | A1* | 11/2017 | Qawami ............ G11C 13/0061 |
| 2019/0013071 | A1* | 1/2019 | Srinivasan ......... G11C 13/0004 |
| 2019/0035469 | A1* | 1/2019 | Ise .......................... G11C 16/10 |
| 2019/0303283 | A1* | 10/2019 | McGlaughlin ........ G06F 3/0616 |
| 2020/0065007 | A1 | 2/2020 | Tai |
| 2020/0065020 | A1 | 2/2020 | Tai |
| 2020/0081828 | A1 | 3/2020 | Chen |

FOREIGN PATENT DOCUMENTS

| | | |
|---|---|---|
| CN | 104025060 A | 9/2014 |
| CN | 104272262 A | 1/2015 |
| KR | 20140037768 A | 3/2014 |
| WO | 2009/110304 A1 | 9/2009 |

OTHER PUBLICATIONS

C. Zambelli, P. Olivo, L. Crippa, A. Marelli and R. Micheloni, "Uniform and concentrated read disturb effects in mid-1X TLC NAND flash memories for enterprise solid state drives," 2017 IEEE International Reliability Physics Symposium (IRPS), Monterey, CA, USA, 2017, pp. PM-5.1-PM-5.4 (Year: 2017).*
Y. Deguchi, T. Tokutomi and K. Takeuchi, "System-level error correction by read-disturb error model of 1Xnm TLC NAND Flash memory for read-intensive enterprise solid-state drives (SSDs)," 2016 IEEE International Reliability Physics Symposium (IRPS), Pasadena, CA, USA, 2016, pp. MY-6-1-MY-6-4 (Year: 2016).*
T. Kim and S. Lee, "Evolution of Phase-Change Memory for the Storage-Class Memory and Beyond," in IEEE Transactions on Electron Devices, vol. 67, No. 4, pp. 1394-1406, Apr. 2020. (Year: 2020).
Yang Zheng, C. Xu and Y. Xie, "Modeling framework for cross-point resistive memory design emphasizing reliability and variability issues, " The 20th Asia and South Pacific Design Automation Conference, China, 2015, pp. 112-117. (Year: 2015).
Xiochun Zhu and Jian-Gang Zhu, "A vertical MRAM free of write disturbance," in IEEE Transactions on Magnetics, vol. 39, No. 5, pp. 2854-2856, Sep. 2003. (Year: 2003).
D.S. Byeon et al., "Disturbance-suppressed ReRAM write algorithm for high-capacity and high-performance memory," 2014 14th Annual Non-Volatile Memory Technology Symposium (NVMTS), Jeju Island, 2014, pp. 1-4. (Year: 2014).
N. Lien et al., "A 40 nm 512 kb Cross-Point 8 T Pipeline SRAM With Binary Word-Line Boosting Control, Ripple Bit-Line and Adaptive Data-Aware Write-Assist," in IEEE Transactions on Circuits and Systems I: Regular Papers, vol. 61, No. 12, pp. 3416-3425, Dec. 2014 (Year: 2014).
H. Li et al., "Statistical assessment methodology for the design and optimization of cross-point RRAM arrays," 2014 IEEE 6th International Memory Workshop (IMW), Taipei, 2014, pp. 1-4. (Year: 2014).
C. Lu and C. Chuang, "A disturb-free subthreshold 9T SRAM cell with improved performance and variation tolerance," 2013 IEEE International SOC Conference, Erlangen, 2013, pp. 325-329. (Year: 2013).
J.Park, S. Kim, J. Baek, D. Seo, J. Chun and K. Kwon, "Analysis of resistance variations and variance-aware read circuit for cross-point ReRAM," 2013 5th IEEE International Memory Workshop, Monterey, CA, 2013, pp. 112-115. (Year: 2013).
Sangheon Lee et al., "Full chip integration of 3-d cross-point ReRAM with leakage-compensating write driver and disturbance-aware sense amplifier," 2016 IEEE Symposium on VLSI Circuits (VLSI_Circuits), Honolulu, HI, 2016, pp. 1-2. (Year: 2016).
M. Tu et al., "A Single-Ended Disturb-Free 9T Subthreshold SRAM With Cross-Point Data-Aware Write Word-Line Structure, Negative (56) References Cited

OTHER PUBLICATIONS

Bit-Line, and Adaptive Read Operation Timing Tracing," in IEEE Journal of Solid-State Circuits, vol. 47, No. 6, pp. 1469-1482, Jun. 2012. (Year 2012).

H. Li et al., "Write disturb analyses on half selected cells of cross-point RRAM arrays," 2014 IEEE International Reliability Physics Symposium, Waikoloa, HI 2014, pp. My 3.1-MY.3.4 (Year: 2014).

International Search Report and Written Opinion from related international application No. PCT/US2019/054019, dated Jan. 17, 2020, 13 pages.

D. Wang, H. Lin, C. Chuang and W. Hwang, "Low-Power Multiport SRAM With Cross-Point Write Word-Lines, Shared Write Bit-Lines, and Shared Write Row-Access Transistors," in IEEE transactions on Circuits and Systems II: Express Briefs, vol. 61, No. 3, pp. 188-192, Mar. 2014 (Year: 2014).

First Office Action from related Chinese patent application No. 201980064685.7, dated Aug. 2, 2021, 9 pages.

\* cited by examiner

ACCESS UNIT AND MANAGEMENT SEGMENT MEMORY OPERATIONS

PRIORITY INFORMATION

This application is a Continuation of U.S. application Ser. No. 17/007,772, filed on Aug. 31, 2020, which is a Continuation of U.S. application Ser. No. 16/149,961, filed Oct. 2, 2018, issued as U.S. Pat. No. 10,817,430 on Oct. 27, 2020, the contents of which are incorporated herein by reference.

TECHNICAL FIELD

Embodiments of the disclosure relate generally to memory sub-systems, and more specifically, relate to access unit and management segment memory operations.

BACKGROUND

A memory sub-system can be a storage system, such as a solid-state drive (SSD), or a hard disk drive (HDD). The memory components can be, for example, non-volatile memory components and volatile memory components. A memory-subsystem can be a memory module, such as a dual inline memory module (DIMM), a small outline DIMM (SO-DIMM), or a non-volatile dual in-line memory module (NVDIMM). A memory sub-system can include one or more memory components. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure are directed to access unit and management segment memory operations. A memory sub-system is also hereinafter referred to as a "memory device." An example of a memory sub-system is a storage device that is coupled to a central processing unit (CPU) via a peripheral interconnect (e.g., an input/output bus, a storage area network). Examples of storage devices include a solid-state drive (SSD), a flash drive, a universal serial bus (USB) flash drive, and a hard disk drive (HDD). Another example of a memory sub-system is a memory module that is coupled to the CPU via a memory bus. Examples of memory modules include a dual in-line memory module (DIMM), a small outline DIMM (SO-DIMM), a non-volatile dual in-line memory module (NVDIMM), etc. In some embodiments, the memory sub-system is a hybrid memory/storage sub-system. In general, a host system can utilize a memory sub-system that includes one or more memory components. The host system can provide data to be stored at the memory sub-system and can request data to be retrieved from the memory sub-system.

Memory sub-systems (e.g., SSDs) can include media management components that can be used to provide handling of management operations to maintain the health of the memory sub-system. Some emerging memory sub-systems such as three-dimensional cross-point (3-DXP) memory sub-systems can require special management handling beyond that of conventional dynamic random-access (DRAM) of a negative-and (NAND) type memory. For example, some memory sub-systems can require management of characteristics such as endurance limitations on the number of read and/or write cycles, drift in the read demarcation voltage, proximity disturb effects on write operations, and/or self-disturb effects on read operations.

Some conventional approaches to handling the management of the above characteristics can include wear-leveling, disturb management, and/or drift management. However, in some conventional approaches, these techniques are implemented on pages of data (e.g., approximately 4 kilo-bytes (KB) of data) at a time. In general, as the amount of data used in performance of wear-leveling, disturb management, and/or drift management techniques increases, the detrimental effects to the memory sub-system can also increase. For example, some approaches that perform disturb management using units that are approximately the size of one page (e.g., 4 KB) of the memory sub-system may incur proximity disturbance and/or self-disturbance effects on the entire page that is written or read.

In contrast, embodiments described herein allow for an access unit size that is smaller than the page size of the memory sub-system. In some embodiments, the access unit size can be, for example, 64 bytes (e.g., $\frac{1}{64}^{th}$ the size of the page size) or 128 bytes (e.g., $\frac{1}{32}^{nd}$ the size of the page size). By providing an access unit size that is smaller than the page size, improved write amplification can be realized in comparison with approaches that use an access unit size that is comparable to the page size. Further, in some embodiments, the access unit size can be comparable to a size of codewords used by a cache line of a processing resource associated with the memory sub-system, which can simplify codeword throughput in comparison to approaches that use an access unit size that is comparable to the page size. A processing resource is a hardware device that performs operations on an external data source. A codeword is an element of a code or protocol, such as a contiguous string of bits associated with computer code or a computing protocol. A cache line is a fixed size unit of data that is transferred between computer memory and various caches of a computing device.

In addition, the present disclosure describes utilization of access units that are of a size less than the page size, which can reduce error correction requirements in comparison to approaches that utilize an access unit size that is comparable to the page size. For example, due to the decreased effects of write disturb that are associated with smaller access units, less error correction can be required to ensure data integrity.

In some embodiments, wear-leveling can be performed using a management segment that is comparable to the page size. For example, 64 byte access units may be combined into a single management segment having a size of approximately 4 KB. By performing wear-leveling on the larger management segment, wear-leveling operations can be optimized while disturb effects are reduced by use of the smaller access unit size. In combination, these may allow for improved write amplification due to reduced disturb effects mentioned above combined with optimized wear-leveling.

Figure 1:
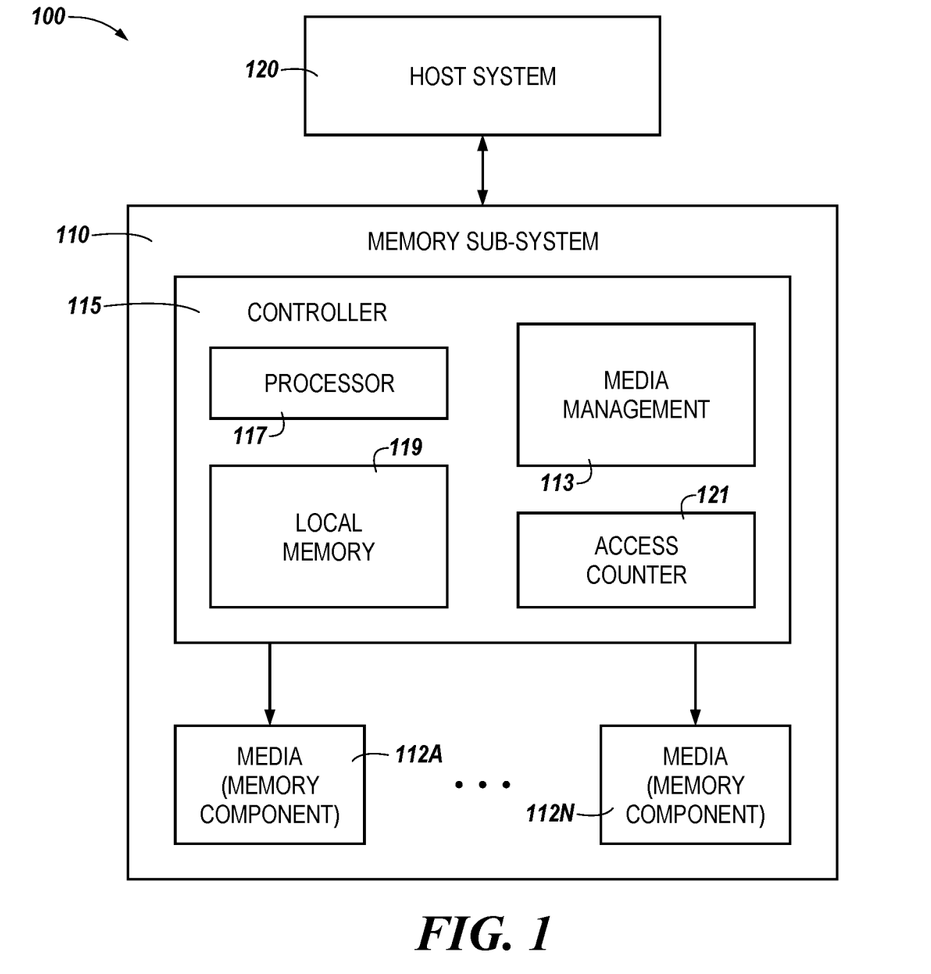
FIG. 1 illustrates an example computing environment that includes a memory sub-system in accordance with some embodiments of the present disclosure.

FIG. 1 illustrates an example computing environment 100 that includes a memory sub-system 110 in accordance with some embodiments of the present disclosure. The memory sub-system 110 can include media, such as memory components 112A to 112N. The memory components 112A to 112N can be volatile memory components, non-volatile memory components, or a combination of such. In some embodiments, the memory sub-system is a storage system. An example of a storage system is a SSD. In some embodiments, the memory sub-system 110 is a hybrid memory/storage sub-system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, internet-of-thing enabled device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 112A to 112N can be based on various other types of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processing device (e.g., processor 117) configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 may not include a controller 115, and may instead rely upon external control (e.g., provided by an external host, or by a processor or controller separate from the memory sub-system).

In some embodiments, the controller 115 includes at least a portion of the media management component 113. For example, the controller 115 can include a processor 117 (processing device) configured to execute instructions stored in local memory 119 for performing the operations described herein. In some embodiments, the media management component 113 is part of the host system 120, an application, or an operating system. Embodiments are not so limited, however, and the media management component 113 can be deployed external to the controller 115.

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory sub-system 110 can also include additional circuitry or components that are not illustrated. For instance, the memory components 112A to 112N can include control circuitry, address circuitry (e.g., row and column decode circuitry), and/or input/output (I/O) circuitry by which they can communicate with controller 115 and/or host 120. As an example, in some embodiments, the address circuitry (can receive an address from the controller 115 and decode the address to access the memory components 112A to 112N.

The memory sub-system 110 includes a media management component 113 (e.g., circuitry and/or logic configured to perform management operations for the memory sub-system 110 as described herein). The media management component 113 can be referred to in the alternative herein as a "processing device." The media management component 113 can be configured to cause access units that each include a particular amount of data to be generated. In some embodiments, the media management component 113 can be configured to generate access units that correspond to a cache line size of the processor 117. For example, the media management component 113 can be configured to generate access units that contain 64 bytes of data, 128 bytes of data, etc. The access units can, in some embodiments, comprise codewords that can be accessed by (e.g., written to, read from, stored by, transferred to or from, etc.) the memory components 112A to 112N. For example, the media management component 113 can received and/or transmit signals to generate access units (e.g., access units 330 described in connection with FIG. 3, herein) and/or management segments (e.g., management segments 332 described in connection with FIG. 3, herein).

The media management component 113 can be further configured to generate a management segment that includes a plurality of the access units. In some embodiments, the management segment may have a size corresponding to a page size of the memory components 112A to 112N (e.g., 4 KB). In this example, the management unit can include sixty-four 64 byte access units, thirty-two 128 byte access segment, etc.

In some embodiments, the media management component 113 can be configured to cause a memory management operation to be performed using the management segment. As an example, the media management component 113 can be configured to cause performance of a wear-leveling operation on the management segment. Embodiments are not so limited, however, and in some embodiments, the media management component 113 can be configured to cause performance of a passive disturb management operation on portions of the memory components 112A to 112N in which the access unit is stored. As used herein, a "passive disturb management operation" can, for example, refer to an operation to manage or reduce effects of disturb effects that can arise when data is written to the memory components 112A to 112N. For example, a passive write disturb management operation can be performed by limiting a size of an access unit and/or writing the access unit across channels of the memory components 112A to 112N, as described in more detail, herein. Embodiments are not limited to performance of either a wear-leveling operation or a passive disturb management operation, however, and in some embodiments, both a wear-leveling operation and a passive disturb management operation can be performed by the media management component 113.

The media management component 113 can be configured to generate and/or append an access count counter 121 to the management segment. For example, the media management component 113 can cause an access count counter 121 corresponding to a quantity of times a memory management operation is performed using the management segment and/or a quantity of times a particular page of the memory components 112A to 112N has had a memory management operation performed thereon. In addition, or in the alternative, the access count counter 121 can be configured to track a frequency of access to portions of the memory components 112A to 112N, as described in more detail below. In some embodiments, the access counter 121 may be used to provide improved write amplification characteristics to the memory components 112A to 112N in comparison to some previous approaches by tracking a quantity of times particular locations of the memory components 112A to 112N are engaged in the performance of memory management operations. Further, the media management component 113 may use the access count counter 121 to take an action to alleviate write amplification to certain portions of the memory components 112A to 112N by, for example, causing memory management operations to be performed on portions of the memory components 112A to 112N that have been used less frequently than other portions of the memory components 112A to 112N.

Figure 2:
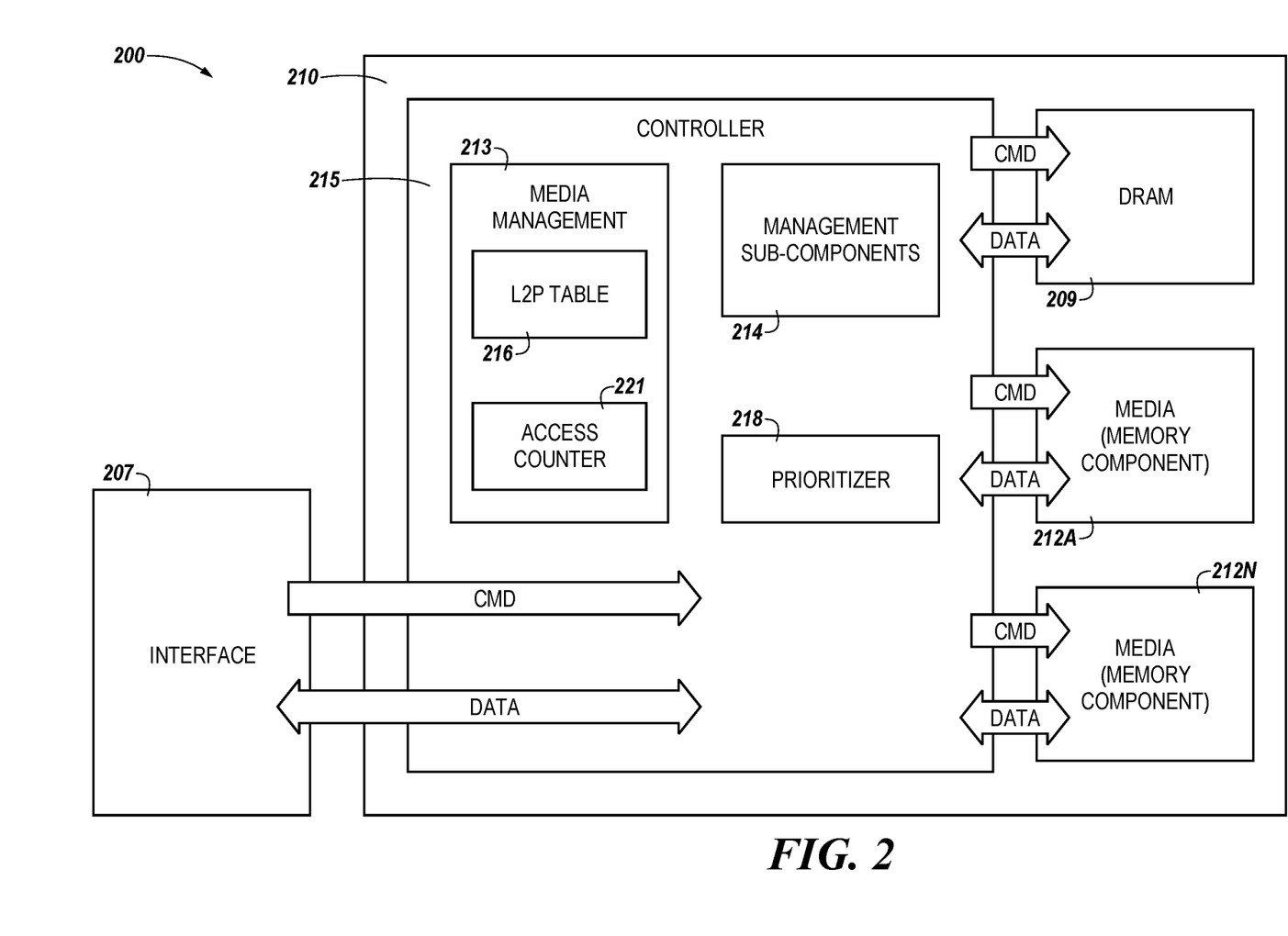
FIG. 2 illustrates another example computing environment that includes a memory sub-system in accordance with some embodiments of the present disclosure.

FIG. 2 illustrates another example computing environment 100 that includes a memory sub-system 110 in accordance with some embodiments of the present disclosure. The memory sub-system 110 can include media, such as memory components 112A to 112N and/or main memory, such as DRAM 209. The memory components 112A to 112N can be volatile memory components, non-volatile memory components, or a combination of such. In some embodiments, the memory sub-system is a storage system. An example of a storage system is a SSD. In some embodiments, the memory sub-system 110 is a hybrid memory/storage sub-system (e.g., a memory sub-system including a 3D Xpoint memory portion and a main memory portion such as a DRAM portion). The computing environment 100 illustrated in FIG. 2 can be analogous to the computing environment 100 illustrated in FIG. 1.

The memory sub-system 110 can be coupled to an interface 207, which can be coupled to a host system such as host system 120 illustrated in FIG. 1, herein. In some embodiments, the interface 207 can be a double data rate interface such as a DDR4, DDR5, DDR-T, etc. interface, or non-volatile dual in-line memory (NVDIMM) interface such as a NVDIMM-N, NVDIMM-P, etc. interface. Embodiments are not limited to these enumerated examples, however, and the interface 207 can be any kind of interface that provides commands (e.g., CMD) to the memory sub-system 110 and/or provides a bi-directional data path (e.g., DATA) to and from the memory sub-system 100. Further, in some embodiments, the memory sub-system 110 can comprise a DDR DIMM including a main memory portion, such as dynamic random-access memory (DRAM) portion, and a three-dimensional non-volatile memory portion such as a 3D cross-point (3D Xpoint) memory portion. In some embodiments, the non-volatile memory portion can be accessed by the host system 120 via a transactional DDR interface. For example, the non-volatile memory portion can be accessed via a DDR access request from the host system 120.

The memory sub-system, 110 can include a media management component 113 (described in more detail in connection with FIG. 1, herein), which can include a logical-to-physical (L2P) table 216. The memory-subsystem 110 can further include management sub-components 214, and/or a prioritizer 218. The management sub-components 214 can include circuitry and/or logic configured to perform media management operations in concert with the media management component 113. For example, the management sub-components 214 can include sub-components configured to perform monitoring of access to the media 112A to 112N to, for example, coordinate corrective read and/or refresh operations to be performed in response to disturb effects, wear-leveling, write-to-read and/or write-to-write timing management, drift management, and/or background media monitoring.

The L2P table 216 can perform logical-to-physical address translation on a management segment level. For example, the L2P table 216 can be configured to provide logical-to-physical address translation for management segments used by the memory sub-system 110. In some embodiments, the L2P table 216 can be referred to herein as a management segment table. As used herein, the management segment table can include information corresponding to segments addresses (e.g., addresses corresponding to access units and/or management segments), time stamps associated with the access units and/or management segments, and/or management segment access count values (e.g., access count counter values).

The prioritizer 218 can include circuitry and/or logic configured to coordinate the operations performed by the management sub-components 214 and/or assign a priority level to the operations performed by the management sub-components 214 to coordinate the operations performed by the management sub-components 214. For example, the prioritizer 218 can be configured to determine an order in which to perform the operations associated with the management sub-components 214 described above. Although shown in FIG. 2 as part of the controller 115, the management sub-components 214 and/or the prioritizer 218 need not be physically disposed on or within the controller. For example, in some embodiments, the management sub-components 214 and/or the prioritizer can be located on or within the memory sub-system 110 and/or portions of the management sub-components 214 and/or the prioritizer 218 can be partially located on or within the controller 115.

In some embodiments, the computing environment 100 can comprise a system for access unit and management segment memory operations. For example, the media management component 113 can maintain a logical to physical data structure 216 whose entries map management segments to respective physical locations in the memory component 113. The management segments can correspond to an aggregated plurality of logical access units having the particular access size. The media management component 113 can be configured to perform a memory operation on a particular access unit having the particular access size, determine a management entry to which the particular access unit corresponds, update attribute data of the management entry, and determine whether to perform a media management operation on the management segment corresponding to the management entry based on the updated attribute data. The attribute data can include count values (e.g., values stored by the access counter 121), flags, threshold count values, etc.

within the management entry. In some embodiments, the management entry can include a management segment address, a time stamp, and/or an access count.

A memory component 112A to 112N can have a particular access size associated therewith. The particular access size can correspond to an input/output (I/O) transfer size of the memory component and is aligned with a transfer size of a host (e.g., host system 120 illustrated in FIG. 1, herein). For example, the particular access size can correspond to a cache line size of the host that is associated with performance of memory operations for the computing environment 100.

As described above, the memory component 112A to 112N can comprise a non-volatile memory. For example, the memory component 112A to 112N can comprise a non-volatile write-in-place capable non-volatile memory and/or a memory that is subject to wear responsive to performance of memory operations. In some embodiments, in addition to the non-volatile memory component 112A to 112N, a DRAM memory portion 209 can be provided to the computing environment as well. It is noted that, in some embodiments, the memory components 112A to 112N can communicate with the host via a DDR interface, as described above.

Figure 3:
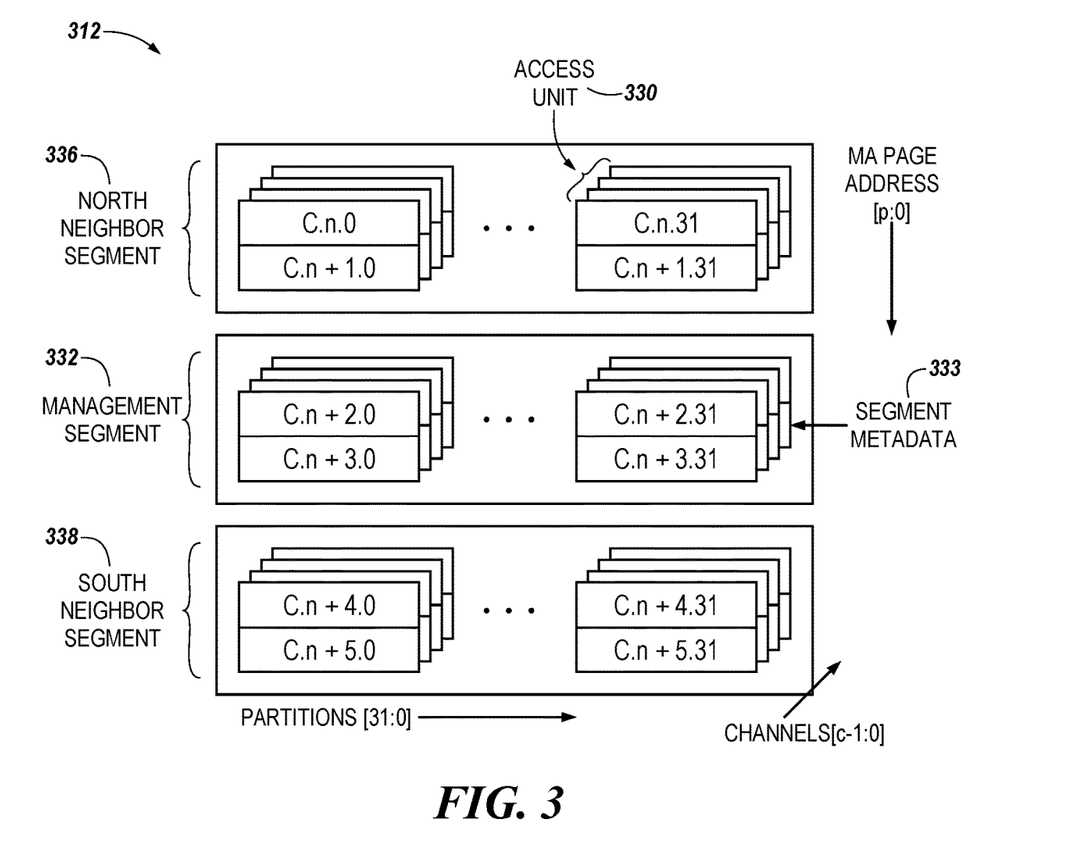
FIG. 3 illustrates an example of a portion of a memory component in accordance with some embodiments of the present disclosure.

FIG. 3 illustrates an example of a portion of a memory component 112 in accordance with some embodiments of the present disclosure. The portion of the memory component 112 can include a plurality of memory channels, which can include pages of memory and/or memory partitions. For example, as shown in FIG. 3, each memory channel (C) can include pages (n, n+1, n+2, . . . , n+5) of memory and/or memory partitions (0 to 31).

An access unit 330 (which can be generated by the media management component 113 discussed in connection with FIG. 1, herein) can be stored across a plurality of channels of a portion of the memory component 113. In some embodiments, the access unit 330 has a size that corresponds to a cache line size of a processor (e.g., processor 117 illustrated in FIG. 1, herein) coupled to the memory component 112. For example, the access unit 330 may have a size of approximately 64 bytes, 128 bytes, etc. As shown in FIG. 3, the access unit 330 is stored across channels C extending into the page (e.g., channel C=0 to channel C−1, as shown in the lower right corner of FIG. 3) of the portion of the memory component 112 that contains pages n and/or n+1 and partition 31 of the memory component 112. As will be appreciated, this particular example is non-limiting, and the access unit 330 can be stored across different channels of different pages and/or partitions of the memory component 112.

In some embodiments, by storing the access unit 330 across a plurality of channels of the memory component 112, write disturb effects may be mitigated in comparison to some previous approaches. Further, in some embodiments, by limiting the size of the access unit 330 to a size that corresponds to a cache line of a processor (e.g., processor 117 illustrated in FIG. 1, herein) coupled to the memory component 112, write disturb effects can be minimized in comparison to some previous approaches. This can lead to a reduction in error correction operations that can be subsequently performed on the access unit 330.

A management segment 332 (which can be generated by the media management component 113 discussed in connection with FIG. 1, herein) can be stored across a plurality of pages of memory (e.g., pages n+2 and/or n+3) and/or partitions (e.g., partitions 0 to 31). As will be appreciated, this particular example is non-limiting, and the management segment 332 can be stored across different pages and/or partitions of the memory component 112. In some embodiments, by storing the management segment 332 across a plurality of pages and/or partitions of the memory component 113, memory management operations, such as wear-leveling operations, can be performed using a quantity of data that corresponds to a page size of the memory component 112, which may allow for effective management of wear-leveling operations while minimizing write amplification effects in comparison to some previous approaches.

In some embodiments, the management segment 332 can have a size that corresponds to page size of the memory component 112. For example, the management segment 332 can be approximately 4 KB in size, which can correspond to a page size of the memory component 112. As a result, in examples in which the access unit 330 size is 64 bytes and the management segment 332 size is approximately 4 KB, the management segment 332 may include sixty-four access units 330. Stated alternatively, the management segment 332 can, in some examples, be generated by combining a plurality of access units 330. In some embodiments, the access units 330 can be combined to form the management segment 332 using the media management component described in connection with FIG. 1 and FIG. 2, above. Stated alternatively, the management segment 332 can comprise an aggregation of access units 330. This can reduce the complexity of tracking access units 330 independently.

The management segment 332 can, in some embodiments, include segment metadata 333. The segment metadata 333 can be a codeword having a particular quantity of bits or bytes associated therewith. The segment metadata 332 can include various management data associated with the memory component 112 and/or the management segment 332. In some embodiments, the segment metadata 333 can be a codeword that includes an access count counter. The access count counter can be incremented in response to performance of memory management operations. For example, the media management component described in connection with FIG. 1 and FIG. 2, above can be configured to cause the access count counter to be incremented in response to accesses by the management segment 332 and/or access unit(s) 330. Further, in some embodiments, the segment metadata can track a frequency of performance of memory management operations to provide improved write amplification in comparison to some previous approaches.

The access count counter (e.g., access counter 121 illustrated in FIG. 1 and FIG. 2, herein) can be monitored as part of processes to improve write amplification of the memory component 112. For example, once the access count counter has reached a threshold quantity of counts, the media management component can take corrective action to reduce write amplification for the memory component 112. In some embodiments, the access count counter can be maintained over the lifetime of the memory component 112.

As shown in FIG. 3, the management segment 332 can have a north neighbor segment 336 located physically above the management segment 332 and a south neighbor segment 338 located physically below the management segment 332. In general, when data is read from or written to portions of the memory component 112, the neighboring regions can experience disturb effects. For example, when the management segment 332 is written to or read from the partitions in which it is stored, the north neighbor segment 336 and/or the south neighbor segment 338 can experience disturb (e.g., write disturb and/or proximity disturb) effects, which can have undesired outcomes to the data stored in the north neighbor segment 336 and/or the south neighbor segment 338.

However, in some embodiments, the undesired outcomes to the data stored in the north neighbor segment 336 and/or the south neighbor segment 338 can be mitigated. For example, through the use of access units 330 and management segments 332, as described above, the undesired effects that can be realized to the north management segment 336 and/or the south management segment 338 can be reduced in comparison to some previous approaches. That is, in some embodiments, by combining performance of passive disturb management operations on the memory component by utilizing access units 330 that are similar in size to the cache line size of the processor with disturb management operations that result from selecting the size of the management segment 332 to be greater than the size of the access units 330, improved write amplification can be realized in comparison with previous approaches.

Figure 4:
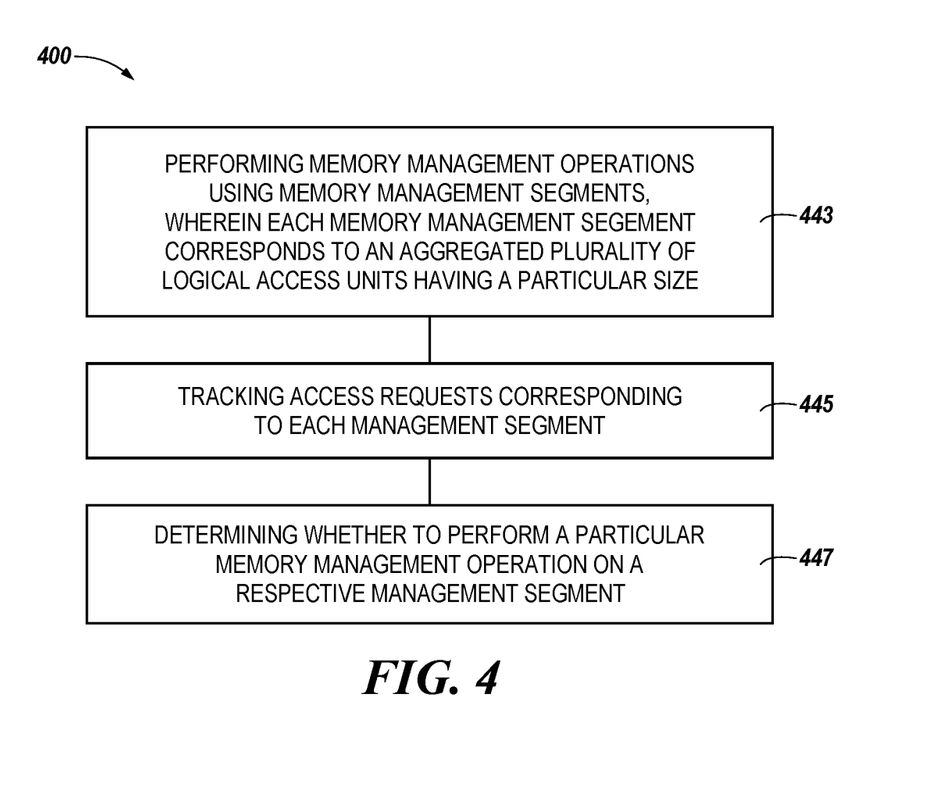
FIG. 4 is a flow diagram of an example method corresponding to access unit and management segment memory operations in accordance with some embodiments of the present disclosure.

FIG. 4 is a flow diagram of an example method corresponding to access unit and management segment memory operations in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the media management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

In some embodiments, the processing device can maintain a logical to physical data structure whose entries map management segments to respective physical locations in a memory component, wherein each management segment corresponds to an aggregated plurality of logical access units have a particular access size. In some embodiments, the access units comprise a first quantity of data. The processing device can be analogous to, or include a portion of, the media management component 113 described in connection with FIG. 1 and FIG. 2, herein. The access units can be analogous to the access unit(s) 330 described in connection with FIG. 3, herein. In some embodiments, the access units can comprise codewords having a quantity of data associated therewith that corresponds to a cache line size of the processing device (e.g., to an input/output (I/O) transfer size of the memory component and is aligned with a transfer size of a host). For example, the first quantity of data may be 64 bytes, 128 bytes, etc.

At block 443, the processing device performs memory management operations using management segments, wherein each management segment corresponds to an aggregated plurality of logical access units having a particular access size. The memory management operations can include wear-leveling operation, disturb management operations (e.g., passive disturb management operations), etc. In some embodiments, performance of memory management operations can include concurrently performing a wear-leveling operation and a disturb management operation.

At block 445, the processing device tracks access requests corresponding to each management segment. The tracking can be performed with the assistance of an access counter (e.g., access counter 121 illustrated in FIG. 1 and FIG. 2, herein). For example, the access counter can be incremented in response to performance of memory management operations until a threshold count value is reached. In some embodiments, multiple access counters can be provided. For example, an access counter can be provided for each management segment. In some embodiments, the access count counter can be incremented in response to performance of a memory operation as part of improving write amplification in accordance with some embodiments of the disclosure.

In some embodiments, the processing device can monitor the access count counter to determine how many memory operations have been performed using the management segment and/or how many memory operations have been performed on a particular portion (e.g., a particular page) of the memory component. Once the access count counter has been incremented to a threshold value, the processing device can cause subsequent memory operations using the management segment to be performed on a different portion of the memory component. In addition (or in the alternative), once the access count counter has been incremented to a threshold value, the processing device can cause subsequent memory operations to be performed using a different management segment, which can be formed using the same access units or different access units.

At block 447, the processing device determines whether to perform a particular memory management operation on a respective management segment based, at least in part, on the tracking. For example, if the access counter has been incremented to a threshold value, the processing device can determine to not perform the particular memory operation. In contrast, if the processing device determines that the access counter has not been incremented to the threshold value, the processing device can determine that another memory management operation can be performed using the management segment.

In some embodiments, the processing device transfers access units to a plurality of channels of a memory component. In some embodiments, the memory component can be analogous to the memory components 112A to 112N discussed in connection with FIG. 1, herein. The access units can be transferred to multiple channels of the memory component, as described in connection with FIG. 3, herein. For example, the access units can be transferred to C-channels of the memory component. In some embodiments, transferring the access units to a plurality of channels of the memory component can include performing a passive disturb management operation on the memory component. For example, by transferring an access unit that is comparable in size to the cache line of the processing device, fewer portions of the memory component can be simultaneously written to in comparison to some previous approaches, which may, in turn, lead to a reduction in write disturb effects experienced by the memory component.

The processing device can further generate a management segment from the access units. The management segment can include a threshold quantity of access units. For example, the management segment can be an aggregated quantity of access units. The access units can be analogous to the management segment(s) 332 described in connection with FIG. 3, herein. In some embodiments, generating the management segment(s) can include combining a quantity of access units into a management segment. As a result, the management segment can have a quantity of data associated therewith that is a greater than a quantity of data associated with the access units. For example, the management segment(s) can include approximately a page size (e.g., approximately 4 KB) of the memory component worth of data.

The processing device can store the management segment in a page of the memory component. The management segment(s) can be stored in multiple pages and/or across multiple partitions of the memory component, as described in connection with FIG. 3, herein. As described above, the management segments can include a metadata segment (e.g., metadata segment 333 illustrated in FIG. 3, herein), which can include an access count counter and/or management metadata.

In some embodiments, the processing device can perform a memory management operation on the management segment. The memory management operation can be a wear-leveling operation as described above. For example, the processing device can cause performance of a wear-leveling operation on the management segment. The wear-leveling operation can be performed to ensure that particular portions of the memory component are not overused and therefore do not deteriorate faster than other portions of the memory component.

In some embodiments, the processing device can cause generation of access units each comprising a codeword having a first quantity of data. In some embodiments, the first quantity of data can correspond to a cache line size of the processing device (e.g., 64 bytes, 128 bytes, etc.). In some embodiments, the processing device can execute instructions to cause the access units to be generated based on data stored in a logical-to-physical mapping table of the memory component.

The processing device can further cause the access units to be stored across c-channels of a memory component. For example, as described above in connection with FIG. 3, the processing device can execute instructions to cause the access units to be distributed across a plurality of channels of a memory component. In some embodiments, by distributing the access units across multiple channels of the memory component, a passive disturb management operation may be performed on the memory component. For example, by storing the access units in this manner, fewer memory locations of the memory component can be written to, which can lead to a reduction in write disturb effects, in comparison to some previous approaches.

The processing device can further cause generation of a management segment having a second quantity of data. The second quantity of data can be greater than the first quantity of data. In some embodiments, the management segment includes a threshold quantity of the access units. For example, if the size of the management segment is approximately 4 KB and the access units each include 64 bytes, the management unit can include sixty-four 64 byte access units.

In some embodiments, the processing device can further cause a metadata codeword to be included in the management segment. The metadata codeword can include information corresponding to a frequency at which the access units and the management segment are stored in the memory component. For example, the metadata codeword can include information that allows a determination to be made as to how frequently access units and/or management segments are stored in the memory component. This information can be used as part of performance of a wear-leveling operation to improve write amplification of the memory component in comparison to some previous approaches.

The processing device can further cause the management segment to be stored in a particular page of the memory component. For example, as described above in connection with FIG. 3, the management segment can be stored in one or pages and/or partitions of the memory component. In embodiments in which the size of the management segment corresponds to a size of a page of the memory component, the management segment can be stored in a single page of the memory component. Embodiments are not so limited, however, and depending on the page size of the memory device and/or the size of the management segment, the management segment can be stored across multiple pages and/or partitions of the memory component.

The processing device can further cause performance of a wear-leveling operation on the particular page of the memory component on which the management segment is stored. As described above, the wear-leveling operation can be performed to ensure that particular portions of the memory component are not overused and therefore do not deteriorate faster than other portions of the memory component.

The processing device can further cause performance of a wear-leveling operation on the particular page of the memory component on which the management segment is stored. As described above, the wear-leveling operation can be performed to ensure that particular portions of the memory component are not overused and therefore do not deteriorate faster than other portions of the memory component.

In some embodiments, the processing device can further cause a metadata codeword to be included in the management segment. The metadata codeword can include information corresponding to a quantity of access counts associated with the management segment. As described above, the access count counter can be incremented in response to a quantity of access counts associated with the management segment. For example, the access count counter can be incremented in response to performance of a memory operation using the management segment and/or performance of a memory operation on a location of the memory component on which the management segment is stored. In some embodiments, the access counter can be incremented regardless of which access unit within the management segment is accessed. This can allow for accurate tracking of the number of times access units are accessed, thereby improving handling of management characteristics in comparison to approaches that fail to track each access to the access units.

The processing device can further cause a determination to be made that the quantity of access counts associated with the management segment has been reached, cause the management segment to be stored on a different page of the memory component, and/or cause performance of a subsequent wear-leveling operation on the different page of the memory component to which the management segment is transferred. For example, once the access count counter has been incremented to a threshold value, the processing device can cause subsequent memory operations using the management segment to be performed on a different portion of the memory component. In addition, once the access count counter has been incremented to a threshold value, the processing device can cause subsequent memory operations to be performed using a different management segment.

Figure 5:
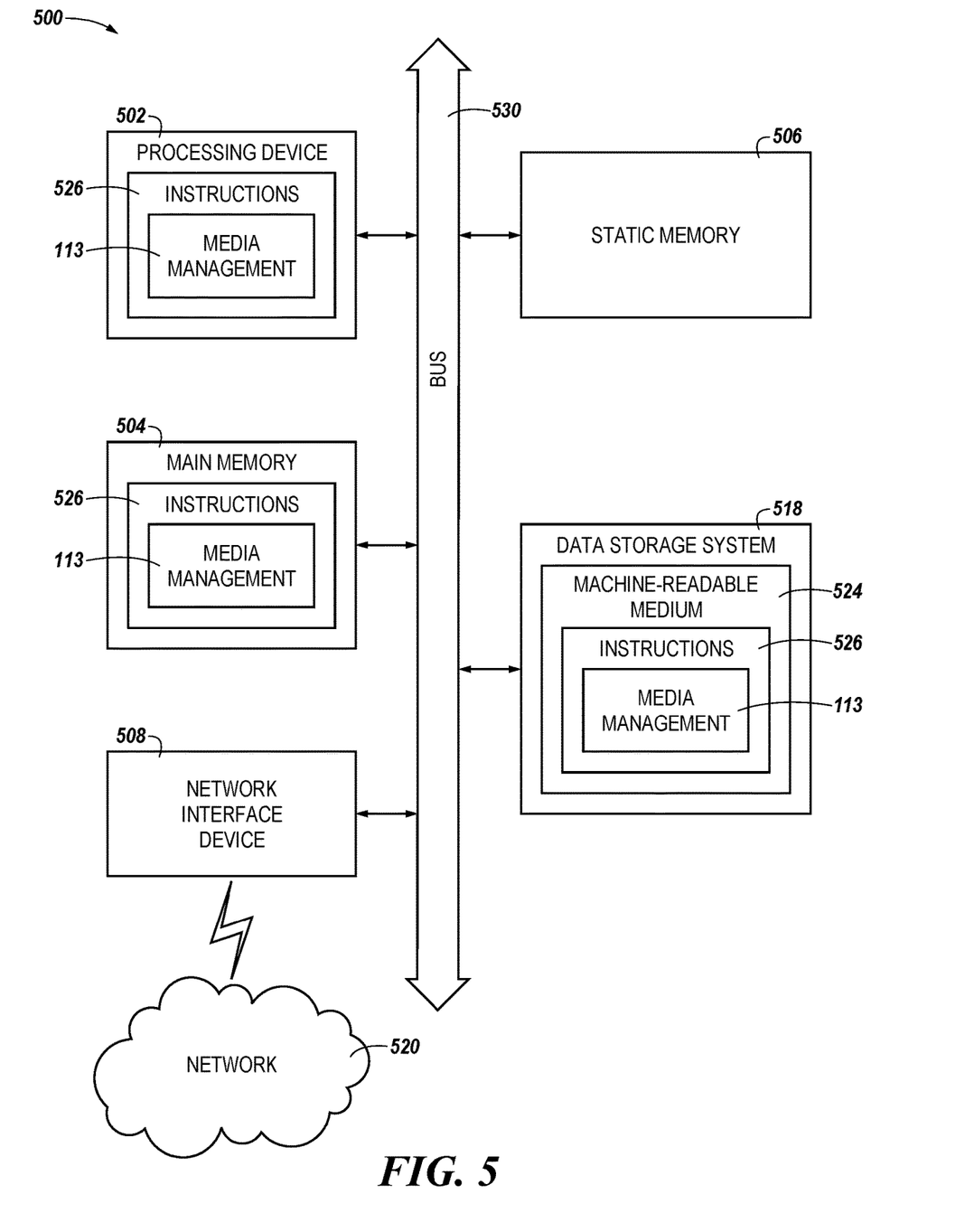
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the media management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random-access memory (DRAM) such as synchronous DRAM (SDRAM) or Rambus DRAM (RDRAM), etc.), a static memory 506 (e.g., flash memory, static random-access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a power management component (e.g., the media management component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. An apparatus comprising:
   a first media on a solid state drive (SSD) having a particular access size corresponding to a logical access unit associated therewith, the logical access unit having a same size as a cache line of a processing device coupled to the first media associated with performance of memory operations;
   a second media on the SSD to store a logical to physical data structure whose management entries map management segments of respective physical locations to the first media, wherein each management segment corresponds to a plurality of logical access units having the particular access size, and each management entry comprises at least one of a management segment address, a time stamp, or an access count, or combinations thereof; and
   the processing device resident on the SSD and coupled to the first media and the second media, wherein the processing device is configured to:
   for each respective management segment, track access requests to constituent access units corresponding to the respective management segment; and
   determine whether to perform a memory management operation on the respective management segment based on the tracking.

2. The apparatus of claim 1, wherein a quantity of data associated with at least one of the plurality of logical access units is less than a quantity of data associated with at least one respective management segment.

3. The apparatus of claim 1, wherein the processing device is configured to cause performance of a wear leveling operation involving at least one of the respective management segments as part of performance of the memory management operation.

4. The apparatus of claim 1, wherein the plurality of logical access units each comprise a codeword with a size corresponding to a cache line size of the processing device.

5. The apparatus of claim 1, further comprising an access counter, wherein the access counter is incrementable in response to performance of the memory management operation.

6. The apparatus of claim 1, wherein the processing device is configured to cause the access units to be written across c-channels of a first portion of the first media or the second media, or both.

7. The apparatus of claim 1, wherein the first media or the second media, or both, comprises a plurality of memory components, and wherein at least one memory component comprises a volatile memory component and at least one memory component of the plurality of memory components comprises a non-volatile memory component.

8. An apparatus comprising:
a media resident on a solid state drive (SSD) having an access size associated with performance of memory operations having a same size as a cache line of a processing device coupled to the first media resident associated with performance of memory operations;
a data structure whose entries map management segments of respective physical locations to the media, wherein each management segment corresponds to a plurality of logical access units having the access size, and further comprise of at least one of a management segment address, a time stamp, or an access count, or combinations thereof; and
the processing device resident on the SSD and configure to, responsive to a request to perform a memory operation using an access unit having the access size:
determine a management entry to which the access unit corresponds;
update attribute data of the management entry; and
determine whether to perform a media management operation on a particular management segment corresponding to the management entry based on the updated attribute data.

9. The apparatus of claim 8, wherein the management entry comprises a management segment address, or a time stamp, or both.

10. The apparatus of claim 8, wherein the access size is an input/output (I/O) transfer size of a memory component and is aligned with a transfer size of a host couplable to the media.

11. The apparatus of claim 8, wherein the media comprises a first memory portion comprising a volatile memory and a second memory portion comprising a write-in-place capable non-volatile memory.

12. The apparatus of claim 8, wherein the media management operation comprises a wear-leveling operation.

13. The apparatus of claim 8, wherein the media management operation comprises a disturb management operation.

14. The apparatus of claim 8, wherein the processing device is further configured to increment an access counter responsive to performance of the memory operation.

15. A method, comprising:
performing memory management operations using management entries that map management segments to respective physical locations of a media, wherein each management segment corresponds to an aggregated plurality of logical access units having an access size;
tracking access requests corresponding to each management segment; and
determining whether to perform a memory management operation on a respective management segment based, at least in part, on the tracking and a determined disturb effect involving at least one management segment physically adjacent to the respective management segment.

16. The method of claim 15, wherein performing the memory management operation comprises performing a wear-leveling operation.

17. The method of claim 15, wherein performing the memory management operation comprises performing a passive disturb management operation.

18. The method of claim 15, wherein the tracking comprises incrementing an access counter in response to performance of each memory management operation.

19. The method of claim 18, further comprising:
determining that the access counter has been incremented to a threshold value; and
performing a subsequent memory management operation on a different management segment using a different age of a memory component responsive to the determination.

20. The method of claim 15, wherein the media comprises a first memory portion comprising a volatile memory and a second memory portion comprising a non-volatile memory.

* * * * *